(12) United States Patent
Hartmann et al.

(10) Patent No.: US 7,808,196 B2
(45) Date of Patent: Oct. 5, 2010

(54) ELECTROMOTIVE AUXILIARY DRIVE FOR VEHICLES

(75) Inventors: Werner Hartmann, Vaihingen/Enz (DE); Miguel A. Sebastian Gonzalez, Stuttgart (DE)

(73) Assignee: Valeo Systemes d'Essuyage, Le Mesnil-Saint-Denis (FR)

( * ) Notice: Subject to any disclaimer, the term of this patent is extended or adjusted under 35 U.S.C. 154(b) by 223 days.

(21) Appl. No.: 12/065,080

(22) PCT Filed: Aug. 25, 2006

(86) PCT No.: PCT/IB2006/003679

§ 371 (c)(1),
(2), (4) Date: Jun. 19, 2008

(87) PCT Pub. No.: WO2007/036810

PCT Pub. Date: Apr. 5, 2007

(65) Prior Publication Data

US 2008/0246374 A1 Oct. 9, 2008

(30) Foreign Application Priority Data

Aug. 27, 2005 (DE) ........................ 10 2005 040 647

(51) Int. Cl.
*H02P 5/00* (2006.01)

(52) U.S. Cl. ........................ 318/443; 318/266; 318/466; 318/470; 318/471

(58) Field of Classification Search ................ 318/266, 318/280, 443, 444, 470, 471; 324/207.25; 310/90, 268
See application file for complete search history.

(56) References Cited

U.S. PATENT DOCUMENTS

| 4,692,677 | A | * | 9/1987 | Bauer et al. | ................. | 318/443 |
| 5,675,206 | A | * | 10/1997 | Horski | ....................... | 310/268 |
| 5,844,338 | A | * | 12/1998 | Horski | ....................... | 310/90 |

(Continued)

FOREIGN PATENT DOCUMENTS

DE 4317259 C2 11/1993

(Continued)

OTHER PUBLICATIONS

English Patent Abstract of EP0359853 from esp@cenet, published Mar. 28, 1990, 1 page.

(Continued)

*Primary Examiner*—Paul Ip
(74) *Attorney, Agent, or Firm*—Osha • Liang LLP

(57) ABSTRACT

In the case of an electromotive auxiliary drive for vehicles, particularly for windscreen wiper drives or adjustment drives for vehicle elements with a secondary transmission for the electromotor, with at least one magnetic sensor, which acts in conjunction with a signal transmitter or permanent magnet arrangement formed of at least one permanent magnet and rotating with a drive shaft or a gear wheel in order to record the angle position and/or modification of the angle position of the rotation of the shaft or the gear wheel, the permanent magnet arrangement is arranged on the front side on a shaft end bedded in a bearing arrangement or on a drive element bedded in the bearing arrangement and arranged on the shaft. The at least one magnetic sensor is arranged opposite the permanent magnet arrangement in the direction of the shaft axis within the bearing arrangement.

20 Claims, 3 Drawing Sheets

U.S. PATENT DOCUMENTS

Figure 1:
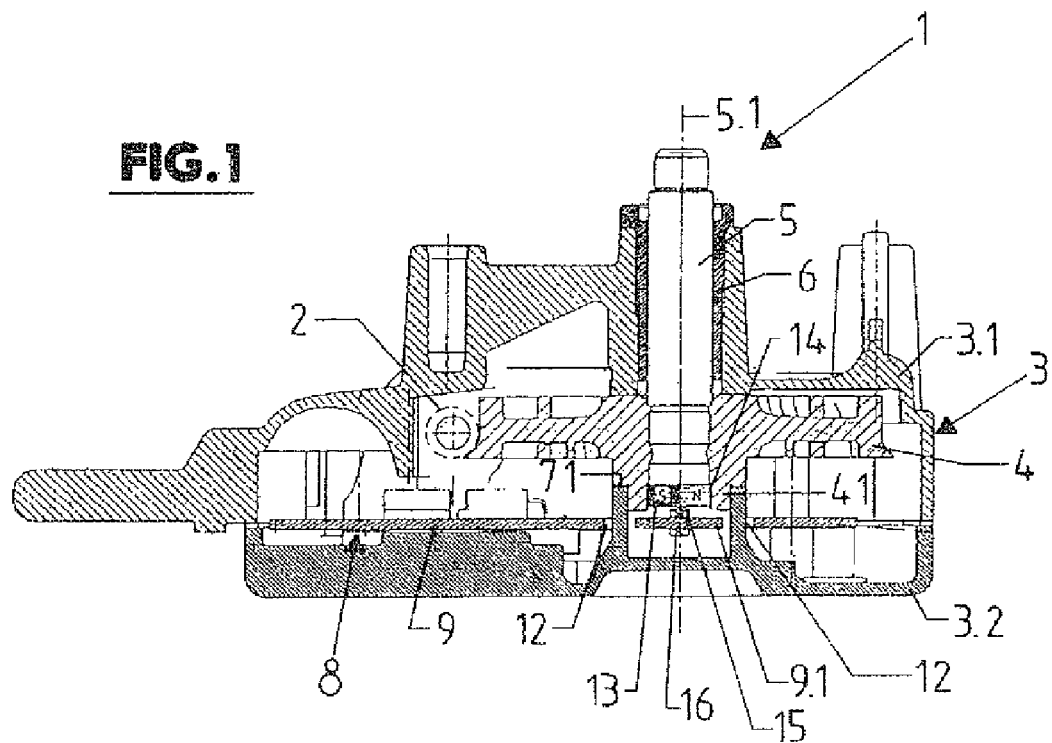

| | | | | |
|---|---|---|---|---|
| 6,163,125 | A | * | 12/2000 | Bernauer et al. ............. 318/626 |
| 6,483,296 | B1 | * | 11/2002 | Hamaoka et al. ....... 324/207.25 |
| 7,489,127 | B2 | * | 2/2009 | Bauer et al. ............ 324/207.25 |
| 2004/0008000 | A1 | * | 1/2004 | Merkel et al. ................ 318/444 |
| 2008/0238415 | A1 | * | 10/2008 | Bauer et al. ............ 324/207.25 |

FOREIGN PATENT DOCUMENTS

| | | |
|---|---|---|
| DE | 19548385 C2 | 7/1997 |
| DE | 19848081 A1 | 3/2000 |
| DE | 10133631 A1 | 1/2003 |
| DE | 10201141 A1 | 8/2003 |
| DE | 10360042 A1 | 7/2005 |
| EP | 0359853 A1 | 3/1990 |
| GB | 2197483 A | 5/1988 |
| WO | WO-95/14911 | 6/1995 |
| WO | WO-2005/040728 A | 5/2005 |

OTHER PUBLICATIONS

English Patent Abstract of GB2197483 from esp@cenet, published May 18, 1988, 1 page.

English Patent Abstract of WO2005040728 from espEcenet, published May 6, 2005, 2 pages.

English Patent Abstract of DE19548385 from esp@cenet, published Jul. 3, 1997, 1 page.

English Patent Abstract of DE10360042 from esp@cenet, published Jul. 21, 2005, 1 page.

English Patent Abstract of DE10201141 from esp@cenet, published Aug. 14, 2003, 1 page.

English Patent Abstract of DE10133631 from esp@cenet, published Jan. 30, 2003, 1 page.

English Patent Abstract of WO9514911 from esp@cenet, published Jun. 1, 1995, 1 page.

International Search Report for PCT/IB2006/003679 mailed Apr. 6, 2007, 6 pages.

German Search Report for German Priority Patent Application No. 10 2005 040 647.5, dated Jan. 26, 2006, 4 pages.

English Patent Abstract from esp@cenet.com, for patent application No. DE 43 17 259, Publication Date: Nov. 25, 1993, 1 page.

* cited by examiner

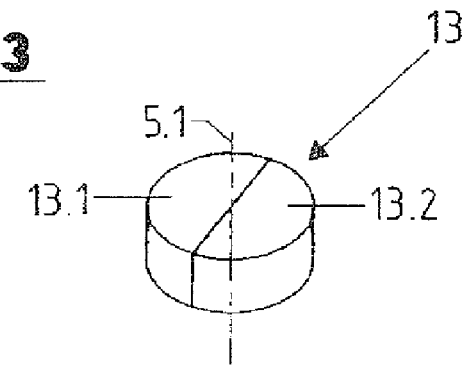
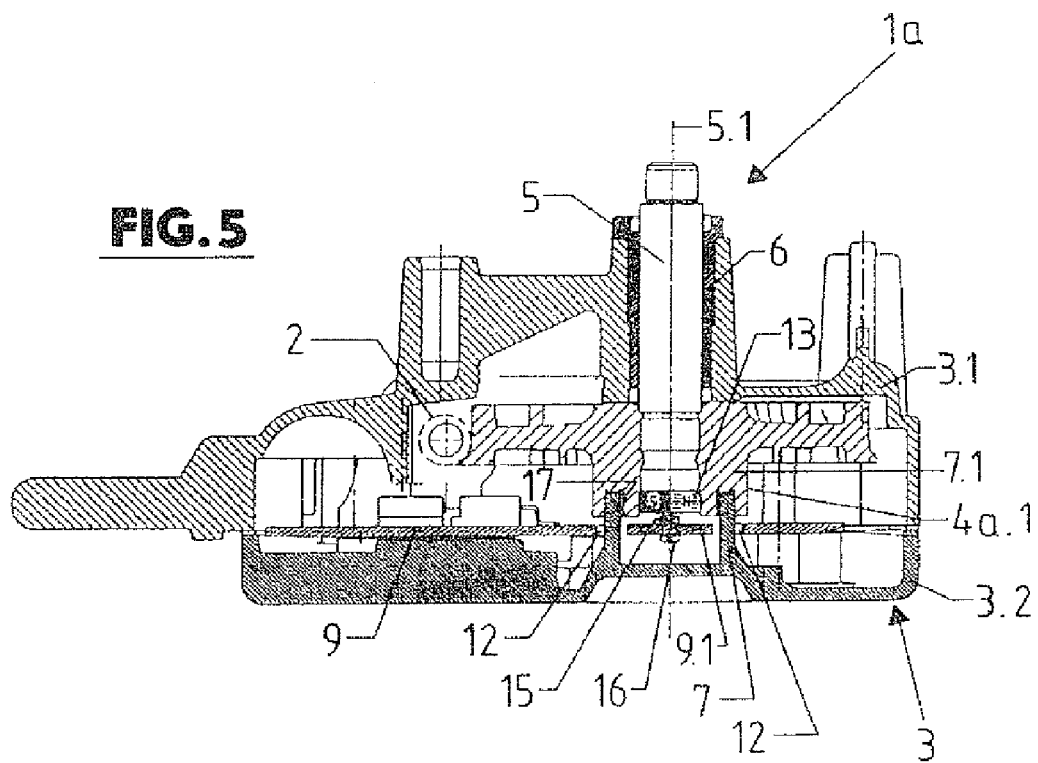

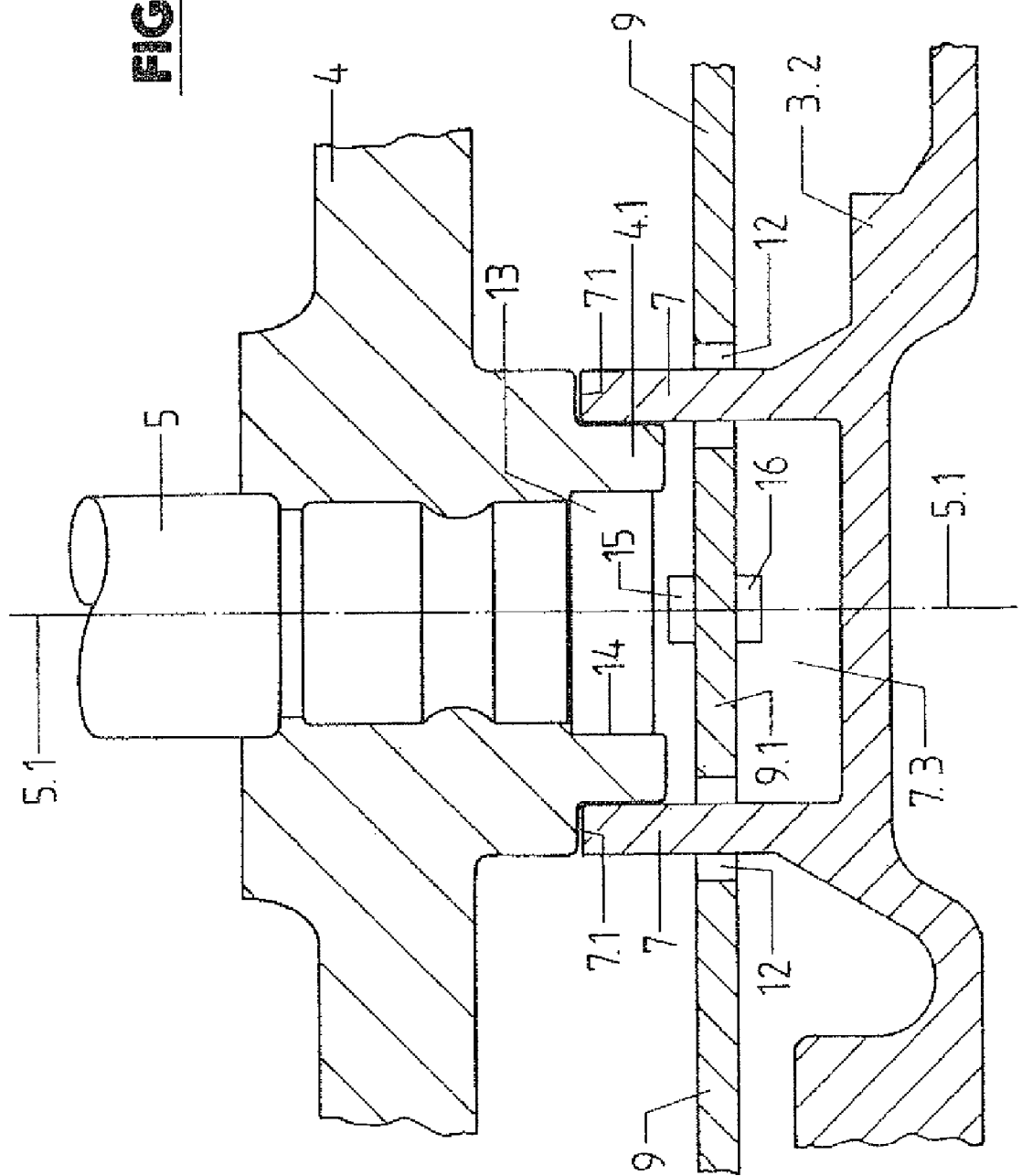

ELECTROMOTIVE AUXILIARY DRIVE FOR VEHICLES

The invention refers to an electromotive auxiliary drive for vehicles, particularly road vehicles according to the generic term in patent claim 1.

Electromotive auxiliary drives, which as a rule consist of an electromotor, a direct current motor for example and a secondary transmission, for example a worm gear, are used in vehicles for the most diverse functions, as a windscreen wiper drive for example, as an actuator, for example in order to adjust the position of vehicle seats and open and close sliding roofs or vehicle windows, etc.

In many cases, it is necessary to make provision for a sensor arrangement or sensor technology at the drive of the auxiliary drive for example, with which the rotating speed, the direction of rotation, the angle and in this case particularly the absolute angle of the drive output shaft or a gear wheel for example are precisely determined, in order to control the electromotor with this, e.g. for a reversing movement of a windscreen wiper gear and/or in order to maintain the predetermined angles for a park and/or reversing position of the wiper arm of a windscreen wiper arrangement and/or in order for example to transfer the data corresponding to the absolute angle for control or synchronisation purposes to other functional elements of the vehicle, for example also through a bus system and/or in order to stop the electromotive auxiliary drive designed as an actuator when the predetermined or preselected positions are reached, etc.

A method and a measurement system in order to determine an absolute angle of a shaft are known in a somewhat theoretical form (DE 103 60 042 A1). In this method and measurement system, various different sensor signals representing a relative angle respectively are generated by means of sensor technology, which has at least two magnetic sensors, which supplies at least one measurement or sensor signal dependent on the size and polarity of a magnetic field and a permanent magnet or signal transmitter arrangement with at least one permanent magnet. The absolute angle is subsequently determined in an electronic system based on this combination. The magnetic sensors have a stationary arrangement in this case, that is to say, either under the shaft and with the centre of its sensor on the axis of this shaft, though with regard to its sensor axis oriented radially towards the shaft axis, twisted against each around the shaft axis by degree of angle or however, the magnetic sensors are arranged with a radial distance laterally from the shaft axis and offset by a degree of angle of less than 90° around this axis. The permanent magnets forming the permanent magnet arrangement are arranged on the shaft and revolve with the latter.

Furthermore, a method for establishing the angle of a rotation axis or shaft is known (DE 195 487 385 C2), in which a permanent magnet oriented radially towards the axis is arranged on the end of the shaft as a signal transmitter, which acts in conjunction with two magnetic sensors offset in the direction of the axis of the shaft opposite the permanent magnet, which for their part, are twisted by 90° in relation to each other with regard to their effective sensor axis, so that with a rotating shaft, the one magnetic sensor delivers a sinusoidal sensor signal and the other magnetic sensor a cosinosoidal signal.

The arrangement of the sensor technology and its elements within an electromotive auxiliary drive and also in particular within a drive casing of such a drive in this case is unknown based on the aforementioned status of technology.

The task of the invention involves demonstrating an electromotive auxiliary drive in which with a structural design optimised for practical use, among other aspects, monitoring and/or determination of the angle position or relative position in addition to their change and particularly in this case the absolute angle position of a shaft, preferably the output shaft of a drive of the auxiliary drive is more readily possible.

In order to solve this shaft, an electromotive auxiliary drive corresponding to patent claim 1 is designed. Further developments of the invention are the subject of the sub-claims.

In the auxiliary drive according to the invention, at least one signal transmitter or permanent magnet arrangement of the sensor is arranged on the front on one end of the shaft and to be precise, in the same manner at least one magnetic sensor of the sensor technology within a bearing arrangement for the bearing of this shaft end. In a preferred form of design, the magnetic sensor is located on a board or a PCB of an electronic control module or an electronic control device. The board or PCB then extends through openings, preferably through at least one radial opening of the bearing arrangement and also into the inside of this bearing arrangement, where it is equipped with at least one magnetic sensor.

The advantages of the invention lie among other aspects in the fact that the sensor technology and its elements may be arranged in the area of the front of the shaft end involved and therefore centred in relation to the shaft axis and to be precise, for an optimum course of the at least one sensor signal depending on the angle of the shaft and that bedding of the shaft in the area of its shaft end equipped with the signal transmitter or permanent magnet arrangement is however possible. Furthermore, the invention is characterised by a simplified and compact construction.

Other advantages lie among other aspects in the fact that the sensor technology for determining the angle does not require any fundamental modification of already existing, tried and trusted designs of an electromotive auxiliary drive without this sensor technology, which also applies particularly to the constructive design of the drive in addition to the drive casing. A further essential advantage also lies in the fact that with the sensor signal delivered by the at least one sensor, the position, the rotation speed and/or direction of rotation of the shaft can also be determined, i.e. an additional, signal transmitter formed by a permanent magnet and corresponding sensor for determination of the rotation speed and/or direction of rotation are not required, which among other aspects also contributes to simplification of construction and reduction of the production costs, particularly by a reduction in the components to be installed. Especially in case of the design of the control electronics and microprocessor-assisted control module electronics, it is possible to optimally adapt the control of the electromotive auxiliary drive to the respective requirements and/or wishes of a user or customer by simple program modification.

With the design according to the invention and the sensor technology, the absolute angle position of the shaft is already known by the sensor signals delivered by the sensor technology immediately after switching on the auxiliary drive.

Figure 2:
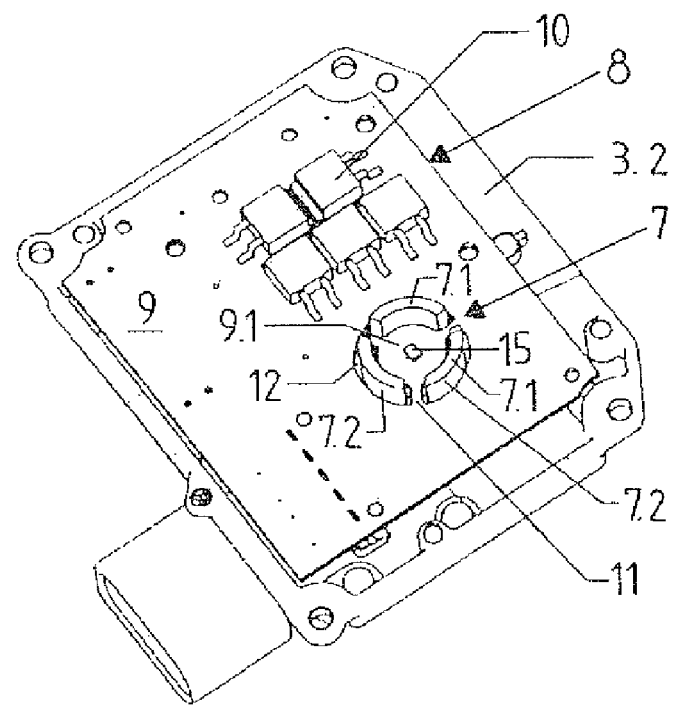

The invention will be described in more detail below based on the figures in examples of realisation. They show:

FIG. 1 a cross-section through the drive housing of an electromotive auxiliary drive;

FIG. 2 perspective representation and top view of a cover-type case component of the drive in FIG. 1;

FIG. 3 individual representation of a signal transmitter or permanent magnet arrangement for use with the sensor technology for which provision is made in the drive in FIG. 1;

FIG. 4 in an enlarge presentation, a detail of FIG. 1;

FIG. 5 a representation similar to FIG. 1 for a further possible embodiment.

In FIGS. 1-4, 1 is the drive of an electromotive auxiliary drive, which in addition to this drive 1 also has an electromotor not represented in the figures, of which the rotor shaft 2 implied in FIG. 1 by a broken line extends into the inside of a drive casing 3 and acts together there with a section of rotor shaft designed as worm gear with a gear wheel arranged inside the drive casing 3 designed as a worm wheel. The drive casing 3 is designed in two parts in the realisation presented and consists of a case section 3.1, to which the electromotor not represented and its housing are flanged in addition to cover-type case component 3.2, which is placed on top of the case component 1 when the case component 3 is closed and is connected to this case component in a suitable manner, by screw-fitting for example.

The gear wheel 4 is positioned on a shaft 5, which forms the output shaft of the drive 1 and the auxiliary drive and which leads out with a shaft end from the drive casing 3 and the case component 3.1 and is rotatably bedded in the area of this shaft end with the bearing 6 in the case component 3.1.

In the area of the other end of the shaft, the shaft 5 has additional bearings and is axially and radially supported and to be precise by a bush-like or ring-like bearing element 7 integrally moulded in the base of the cover-type case component 3.2 and projecting from the interior surface of this base into the inside of the drive casing 3. In this bearing element 7 arranged in the same axis as the shaft axis 5.1, the gear wheel 4 meshes in for radial support with a hub-like section 4.1, which forms a ring or regular cylinder-shaped bearing surface concentrically enclosing the shaft axis 5.1. Furthermore, the gear wheel 4 is supported axially against the front surface 7.1 of the bearing element 7.

In order to control the auxiliary drive and the electromotor not represented, an electronic, microprocessor-assisted control device 8 (control module) is also accommodated in the drive casing and to be more precise, with a board or PCB 9, on which, among others, the components of the control device 8 are arranged. The control device 8 and its PCB 9 are fixed to the inside surface of the cover-type case component 3.2 and to be more precise, in such a way that when the drive casing 3 is closed, the surface sides of the PCB 9 are oriented in levels vertically to the shaft axis 5.1 and the PCB 9 is located approximately at the position where, with the drive casing 3 closed, the edge of the cover-type case component 3.2 joins with the opening edge of the case component 3.1.

The bush-like bearing element 7 has multiple slots starting from its free edge distant from the base of the case component 3.2, so that owing to the corresponding slots 11, a segment-like design of the bearing element 7 results and to be more precise, for the realisation presented, with three slots 11, the design with three ring segments 7.2.

The PCB 9 is equipped with the openings 12 corresponding to the ring segments 7.2, so that during fixing of the PCB 9 to the inside of the case component 3.2 can be pushed-fitted with the holes 12 on to the bearing element 7 and on to the ring segments 7.2. and the ring segments 7.2 project over the side of the PCB 9 facing the case component 3.1. The PCB 9 then also has within the bearing element 7, i.e. in the inside 7.3 of the bearing element the PCB section 9.1. Preferably, the slots 11 are designed in such a way that starting from the free edge of the bearing element 7, they do not extend over the entire height of the bearing element, but instead at an interval from the base of the case component 3.2 at the level of the underside of the PCB 9 facing away from the gear wheel 4, so that the PCB is also supported in the area of the slots 11.

At the shaft end of the shaft 5 distant from the bearing 6, provision is made for a permanent magnet arrangement 13 at the front, which is formed with the realisation corresponding to FIG. 3 by a disc-shaped permanent magnet 13, which is designed and magnetised in such a way that it forms with one cylinder half 13.1 a south pole and with the second cylinder half 13.2 a north pole. The areas of different poling with the highest field strength are therefore positioned diametrically opposite each other in relation to the axis of the cylinder-shaped permanent magnet 13. In the execution presented, the permanent magnet 13 is accommodated in appropriate cylindrical opening 14, which in the presentation selected for FIG. 1 is open towards the PCB 9 at the underside and limited at the top by the front side of the shaft 5. Opposite the permanent magnet 13, arranged with its axis in the same axis as shaft axis 5.1, two magnetic sensors 15 and 16 are arranged at the section 9.1 of the PCB 9 and to be more precise in the realisation presented, with the magnetic sensor 15 on the upper side facing the permanent magnet 13 and the magnetic sensor 16 on the underside of the PCB 9 facing away from the permanent magnet 13.

Both magnetic sensors 15 and 16, which are accommodated in the inside 7.3 of the ring-shaped bearing element 7 closed to the outer side of the case element 3, respectively deliver at least one electric sensor signal dependent on the magnetic field (among other aspects field strength and/or direction of the magnetic field) and/or modification of the magnetic field. The magnetic sensors 15 and 16 are for example electric magnetic resistances, the resistance value of which changes depending on the magnetic field or hall sensors. The magnetic sensors are arranged in such a way on the PCB section 9.1 that the shaft axis 5.1 intersects the respective sensor 15 and 16 in its sensor centre point, the magnetic sensors 15 and 16 with their effective axis are arranged radially to the shaft axis 5.1 and furthermore are twisted around the shaft axis 5.1 by a predetermined degree of angle of less than 90° in relation to one another.

When the shaft 5 and the gear wheel 4 are rotated, the permanent magnet 13 moves at the same time, so that both magnetic sensors 15 and 16 deliver at least one sensor signal respectively owing to the rotating magnetic field and owing to the changing orientation of the magnetic field in relation to the effective axes of the sensors, which for example shows a sinusoidal or cosinosoidal course depending on the rotation of the shaft 5, with the sensor signals of the magnetic sensors 15 and 16 being phase-displaced corresponding to the different orientation of their effective sensor axes. On the basis of the sensor signals delivered by the magnetic sensors 15 and 16 and their combination, it is possible to determine the absolute angle position and rotation of the shaft 5. Furthermore, the control device 8 can not only determine the position, but also the rotation speed and/or the direction of rotation of the shaft 5 based on the sensor signals, e.g. from the temp oral modification and/or polarity and/or phase relation of these signals.

Through the design described, it is possible, in spite of the additional support of the shaft 5 and the gear wheel 4 through the bearing element 7, to arrange the elements of the sensor technology centred in the same axis as the shaft axis 5.1 and in relation to the shaft axis 5.1, so that for the sensor signals, the sensor signals corresponding to the sinusoidal or cosinosoidal course or at least optimally approximating sensor signals are maintained, with which the respective angle position of the shaft 5 and particularly also the respective absolute angle position of this shaft can be determined by the control device 8 with a high degree of accuracy.

With the control device 8 and the sensor technology formed by the permanent magnet 13 and the magnetic sensors 15 and 16, a precise control of the electromotive auxiliary drive and the electromotor of this drive, e.g. for a reverse rotary movement of the shaft 5 is possible for example. Furthermore, the angle position of the shaft 5 can also be used for other control and monitoring purposes, for example for synchronous activation of the auxiliary drive with other functional elements, with transfer of the absolute angle determined by the sensor technology to other functional and control elements or devices through bus systems for example being possible. Insofar as the auxiliary drive and the drive 1 are part of an actuator, e.g. for seat position adjustment, for opening and closing of a sliding roof or a car window, etc., the sensor technology and the sensor signals delivered by the latter can also be used for monitoring and/or control of the respective actuator travel and/or the permitted limits of a movement, etc.

Furthermore, it is also possible of course to use the sensor signals delivered by the sensor technology for determination of the rotation speed and/or direction of rotation of the shaft 5.

FIG. 5 shows a drive 1*a* as a further realisation in a presentation like FIG. 1, which essentially only differs from the drive 1 by the fact that the gear wheel 4*a* corresponding to the gear wheel is supported both on the inside surface and the outside surface of the bearing element 7 and the corresponding ring segments 7.2. For this purpose, the gear wheel 4*a* is equipped on a hub-like section 4*a*.1 with a gutter 17 open to the front side and concentrically enclosing the shaft axis 5.1, in which the bearing element 7 and the latter's ring segment are accommodated with a partial length projecting over the PCB 9.

The invention has been described above based on examples of execution. It is understood that modifications and alterations are possible without as a result abandoning the thoughts on which the invention is based.

It is therefore possible for example, instead of the permanent magnet 13, to make provision for another magnet arrangement, which creates a magnetic field in the area of the magnetic sensors 15 and 16, which rotates with the rotary motion of the shaft 5 and which results in different sensor signals to the magnetic sensors 15 and 16 depending on the rotation.

It has been assumed above that the sensor technology has two magnetic sensors 15 and 16. In principle, it is also possible to make provision for only one such sensor 15 or 16 or also however use a sensor component with the function of two or more magnetic sensors.

LIST OF REFERENCE MARKS

1, 1*a* Drive
2 Rotor shaft
3 Drive casing
3.1, 3.2 Casing component
4, 4*a* Gear wheel
4.1, 4*a*.1 Hub-like section of gear wheel
5 Shaft
5.1 Shaft axis
6 Bearing
7 Bearing element or additional bearing
7.1 Front side
7.2 Ring segment
7.3 Interior of bearing element
8 Electronic control device
9 PCB
10 Electronic components
11 Slot
12 Opening
13 Permanent magnet
13.1, 13.2 Section or pole of the permanent magnet 13
14 Opening
15, 16 Magnetic sensor
17 Groove

The invention claimed is:

1. Electromotive auxiliary drive for vehicles, particularly for windscreen wiper drives or adjustment drives for vehicle elements, with
    a secondary transmission for electromotor, with at least one magnetic sensor, which acts in conjunction with a signal transmitter or permanent magnet arrangement formed of at least one permanent magnet and rotating with a drive shaft or a gear wheel in order to record among other aspects the angle position and/or modification of the angle position of the rotation of the shaft or the gear wheel, characterised by the fact that
    the permanent magnet arrangement is arranged on the front side on a shaft end bedded in a bearing arrangement or on a drive element bedded in the bearing arrangement and arranged on the shaft and that the at least one magnetic sensor within the bearing arrangement is arranged opposite the permanent magnet arrangement in the direction of the shaft axis.

2. Auxiliary drive according to claim 1, characterised by the fact that the axis of the sensor technology formed by the at least one magnetic sensor and the permanent magnet arrangement is arranged in the same axis as the shaft axis.

3. Auxiliary drive according to claim 1, characterised by the fact that the permanent magnet arrangement is formed of a permanent magnet forming a north pole and a south pole and that the north pole and south pole of the permanent magnet are diametrically opposition in relation to the shaft axis.

4. Auxiliary drive according to claim 1, characterised by the fact that the permanent magnet arrangement is arranged on the end of the shaft on the front side of the shaft.

5. Auxiliary drive according to claim 1, characterised by the fact that the permanent magnet arrangement is arranged in an opening of the shaft or of a drive element arranged on the shaft.

6. Auxiliary drive according to claim 1, characterised by the fact that the at least one magnetic sensor delivers at least one sensor signal dependent on the magnetic field or modification thereof.

7. Auxiliary drive according to claim 1, characterised by the fact that the at least one magnetic sensor delivers at least one sensor signal dependent on the direction or polarity of the magnetic field.

8. Auxiliary drive according to claim 1, characterised by the fact that the at least one magnetic sensor is a magnetic resistance or a hall sensor.

9. Auxiliary drive according to claim 1, characterised by the fact that the shaft axis intersects the at least one magnetic sensor in its sensor centre point.

10. Auxiliary drive according to claim 1, characterised by the fact that the at least one magnetic sensor is oriented with its sensor axis radially to the shaft axis.

11. Auxiliary drive according to claim 1, characterised by the fact that at least two magnetic sensors are arranged offset against each other in the direction of the shaft axis.

12. Auxiliary drive according to claim 11, characterised by the fact that the at least two magnetic sensor are arranged twisted against each other by a degree of angle around the shaft axis.

13. Auxiliary drive according to claim 1, characterised by the fact that the at least one magnetic sensor is arranged on a board or PCB of a control module.

14. Auxiliary drive according to claim 13, characterised by the fact that the board is oriented with its surface sides vertically to the shaft axis.

15. Auxiliary drive according to claim 1, characterised by the fact that the bearing arrangement consists of a bearing element projecting from a case section of the drive into the inside of the drive, forming at least one bearing surface and equipped with a cutout to receive at least the permanent magnet arrangement and the magnetic sensors and that the bearing element is passed through openings in the PCB in such a way that one section of the PCB carrying one of the at least one magnetic sensors is located within the cutout of the bearing element.

16. Auxiliary drive according to claim 15, characterised by the fact that the bearing element is slotted in an axis direction parallel to the shaft axis.

17. Auxiliary drive according to claim 16, characterised by the fact that the bearing element has at least one slot.

18. Auxiliary drive according to claim 17, characterised by the fact that the bearing element is divided into at least two segments by a slot.

19. Auxiliary drive according to claim 18, characterised by the fact that the segments are passed respectively through an opening in the PCB.

20. Auxiliary drive according to claim 2, wherein the permanent magnet arrangement is formed of a permanent magnet forming a north pole and a south pole and that the north pole and south pole of the permanent magnet are diametrically opposition in relation to the shaft axis.

* * * * *